W. R. GARDNER.
REFRIGERATING DEVICE.
APPLICATION FILED MAR. 6, 1911.
1,006,475.
Patented Oct. 24, 1911.
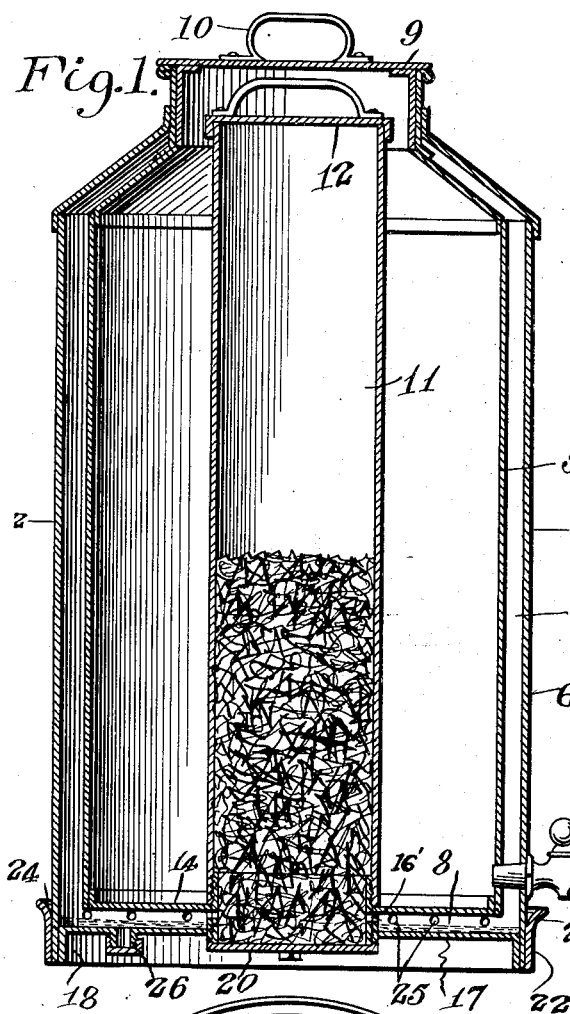
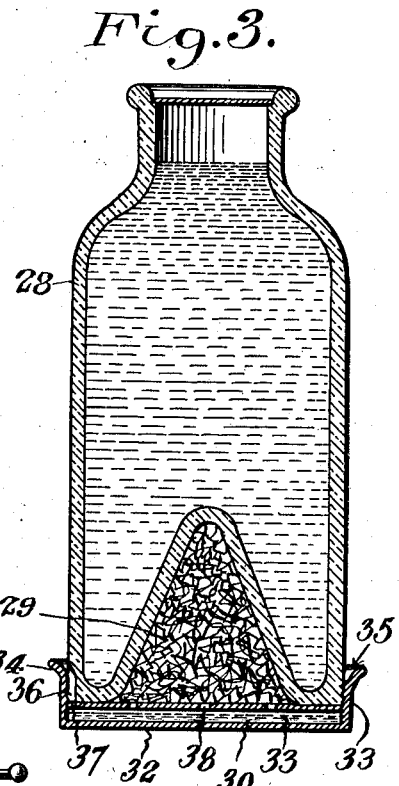
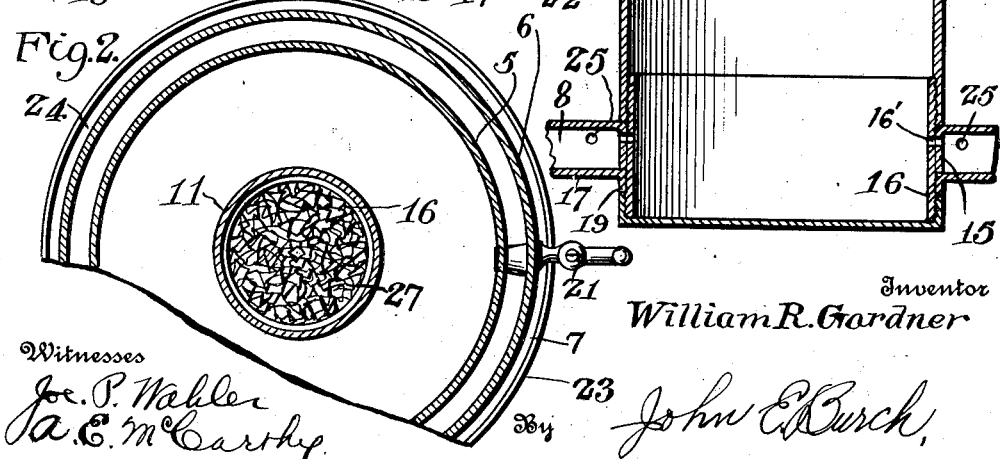
Inventor
William R. Gardner

UNITED STATES PATENT OFFICE.

WILLIAM R. GARDNER, OF LOS ANGELES, CALIFORNIA, ASSIGNOR OF ONE-HALF TO JEROME CRAITE, OF LOS ANGELES, CALIFORNIA.

REFRIGERATING DEVICE.

1,006,475.  Specification of Letters Patent.  Patented Oct. 24, 1911.

Application filed March 6, 1911. Serial No. 612,669.

*To all whom it may concern:*

Be it known that I, WILLIAM R. GARDNER, a citizen of the United States, and residing at Los Angeles, in the county of Los Angeles and State of California, have invented certain new and useful Improvements in Refrigerating Devices, of which the following is a specification.

This invention relates to refrigerating devices and is designed particularly for embodiment in the structure of a milk-can, and the invention aims to provide for the proper refrigeration of milk and other liquids with an economical consumption of ice.
Whether the principles of the invention are embodied in a milk-can, water cooler, or any other like container, the invention contemplates that the liquid to be cooled shall not come in contact with the ice employed for this purpose, and that the ice be contained in a compartment arranged within the receptacle for the liquid to be cooled, so that the liquid will receive the full cooling effect of the ice.
In the accompanying drawing:—Figure 1 is a vertical sectional view through a milk-can constructed in accordance with the present invention. Fig. 2 is a horizontal sectional view therethrough on the line 2—2 of Fig. 1. Fig. 3 is a view similar to Fig. 1 illustrating a milk bottle embodying the invention. Fig. 4 is a detail vertical sectional view through the lower portion of the ice container.
Corresponding and like parts are referred to in the following description and indicated in all the views of the drawing by the same reference characters.

In the drawings, the numeral 5 indicates the liquid container or body of the can, which is of the ordinary form, and is closed at its top by means of an ordinary cover 9, such as is provided upon such cans. This cover 9 is provided with the usual handle
10. The container 5 is inclosed within a shell 6, its walls being spaced from the walls of the shell as well as its bottom, indicated by the numeral 14, and this arrangement results in the formation of an air-jacket 7 surrounding the container 5. The space between the bottom of the container 5 and the bottom of the shell 6, which latter is indicated by the numeral 17 and has a flange 18 soldered or otherwise secured within the lower end of the shell, is indicated by the numeral 8, and the wall of the shell 6 is formed with openings 25 which are located below the horizontal plane occupied by the bottom 14 of the container 5. A band 22 is secured to the lower end of the shell 6 and completely surrounds the same and has a flared upper portion 23, the upper edge of which is located in a plane above the horizontal plane in which the openings 25 are located so that the water accumulating in the space 24 between the container and shell will not overflow after it issues through the openings 25. To permit of the discharge of the accumulated water, a screw-closure 26 is provided to close an opening in the bottom 17 of the shell 6.

The ice compartment of the device is in the nature of a cylinder 11 which is of about the same height as the container 5 and at its lower end is threaded onto the upper end of a tubular shell 16 which is secured within an annular flange 15 surrounding an opening in the bottom 17 of the container 5. A depending annular flange 19 surrounding an opening in the bottom 17 of the shell 6, is also secured to the tubular shell 16 and the lower end of this shell projects beneath the bottom 17 of the shell 6 and is exteriorly threaded for the application thereto of a cap closure 20, which serves to close the lower end of the ice receptacle. The upper end of the said ice compartment is closed by means of a cover 12 having a handle 13. The shell 16 and the flange 15 are formed with registering openings 16' which establishes communication between the interior of the ice compartment and the space 8 between the bottom of the container 5 and bottom 17 of the shell 6.

In using the device, ice is packed into the compartment 11 to the desired height and the cover 12 is then placed upon the compartment, after which the milk or other liquid to be cooled is poured into the container 5 from which it may be drawn through a faucet 21. As the ice within the compartment 11 melts, the water resulting therefrom, flows through the openings 16' and accumulates in the space 8 between the bottom of the container and the shell. As the water rises in this space it flows through the openings 25 and within the flared upper end of the band 22. A water seal is thus formed for the air-jacket surrounding the container 5.

In Fig. 3 of the drawing, there is shown a milk bottle 28 having an inwardly projecting conical bottom 29 and the lower end of the body of the bottle 28 is removably threaded into a flange 33 projecting upwardly from a circular plate 30. A disk 31 is secured within flange 33 and is formed with perforations 38. The lower end of the bottle 28 rests on the disk 31 and the drippings from cracked ice contained within the cavity of the bottom 29 may flow through the openings 38 and into the space between the disk 31 and the plate 30. At intervals, the wall of the bottle 28 is formed exteriorly with vertically extending grooves 36 and the flange 33 is flared at its upper end as at 34 to form a channel way 35 into which a portion of the drippings may flow for the purpose of forming a water seal for the ice-receiving compartment formed by the bottom 29.

Having thus described the invention what is claimed as new is:—

1. In a refrigerating device, a container, a shell inclosing the container and spaced from the walls thereof, and an ice-compartment arranged within the container and spaced from the walls thereof and having an opening in the wall communicating with the space between the container and shell, the shell having a band at its bottom and formed in its wall with openings for the discharge of accumulated moisture to the band, and forming a liquid seal for the space between the container and shell.

2. In a refrigerating device, a container, a shell inclosing the container and spaced from the walls thereof, and an ice-compartment arranged within the container and spaced from the walls thereof, the bottom of the container being spaced from the bottom of the shell and the wall of the compartment being formed with an opening establishing communication between the interior of the compartment and the said space between the bottoms of the container and shell, the wall of the shell being formed with openings in a plane below the plane of the bottom of the container, and the shell being provided at its bottom with a flared band terminating above the plane of the said bottom of the container.

3. In a refrigerating device, a container, a shell inclosing the container and spaced from the walls thereof, an ice-receptacle arranged within the container and spaced from the walls thereof, a tubular shell fitted through the bottoms of the container and first mentioned shell and secured in the lower end of the ice-receptacle, a removable closure for the lower end of the last mentioned shell, the shell being formed with an opening establishing communication between the interior of the ice-receptacle and the space between the bottoms of the container and first mentioned shell, and a flared drip band upon the exterior of the first mentioned shell, the wall of the first mentioned shell being formed with an opening below the plane of the upper edge of the band.

4. In a refrigerating device, a container, an ice compartment within the container, a drip-chamber at the bottom of the container arranged to receive drippings from the ice in the compartment, and a flared drip band surrounding the container, one wall of the drip chamber being formed with an opening and the band projecting above the opening and arranged to receive the overflow from the drip chamber.

In testimony whereof I affix my signature in presence of two witnesses.

WILLIAM R. GARDNER.

Witnesses:
T. JARRETT E. AYCOCK,
CHARLES F. AYCOCK.